(12) United States Patent
Geiger et al.

(10) Patent No.: US 10,458,543 B2
(45) Date of Patent: Oct. 29, 2019

(54) POWER SPLIT TRANSMISSION AND METHOD FOR OPERATING SUCH POWER SPLIT TRANSMISSION

(71) Applicant: ZF Friedrichshafen AG, Friedrichshafen (DE)

(72) Inventors: Simon Geiger, Oberteuringen (DE); Matthias Madlener, Hohentengen (DE); Robin Cramer, Tübingen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 209 days.

(21) Appl. No.: 15/413,531

(22) Filed: Jan. 24, 2017

(65) Prior Publication Data

US 2017/0211695 A1 Jul. 27, 2017

(30) Foreign Application Priority Data

Jan. 25, 2016 (DE) .................. 10 2016 200 992

(51) Int. Cl.
*F16H 61/444* (2010.01)
*F16H 61/70* (2006.01)
(Continued)

(52) U.S. Cl.
CPC ........... *F16H 61/46* (2013.01); *F16H 61/702* (2013.01); *B60K 2025/026* (2013.01);
(Continued)

(58) Field of Classification Search
CPC ...... F16H 61/444; F16H 61/702; F16H 47/02; F16H 2306/20; B60Y 47/02; B60Y 2200/415; B60K 2025/026
See application file for complete search history.

(56) References Cited

U.S. PATENT DOCUMENTS 4,766,779 A * 8/1988 Massy .................. F16H 47/02
475/83
5,586,953 A * 12/1996 Abo .................... B60T 8/175
192/222

(Continued)

FOREIGN PATENT DOCUMENTS

DE 196 41 723 A1 6/1997
DE 197 44 218 C1 4/1999
(Continued)

OTHER PUBLICATIONS

German Search Report Corresponding to 10 2016 200 992.3 dated Nov. 7, 2016.

*Primary Examiner* — Tinh T Dang
(74) *Attorney, Agent, or Firm* — Davis & Bujold PLLC; Michael J. Bujold (57) ABSTRACT

A power-split transmission which is designed to be operated with either first or second deceleration logics. The second deceleration logic has a higher deceleration dynamic than the first deceleration logic, and is designed to disengage an engaged range clutch immediately so as to reduce the transmission ratio by way of a hydrostatic unit with a maximum dynamic. A method of operating the transmission includes: monitoring various vehicle parameters while the vehicle is operated with the first deceleration logic; detecting that at least one set limit value has been exceeded while the vehicle operated with the first deceleration logic; activating the second deceleration logic, to immediately disengage an engaged range clutch; reducing a transmission ratio to a maximum using the hydrostatic unit, the hydrostatic unit being displaced with a maximum dynamic; and engaging the range clutch and activating the first deceleration logic.

11 Claims, 3 Drawing Sheets

(51) Int. Cl.
  *F16H 47/02*   (2006.01)
  *B60K 25/02*   (2006.01)
  *F16H 61/46*   (2010.01)

(52) U.S. Cl.
  CPC ..... *B60Y 2200/415* (2013.01); *B60Y 2400/72* (2013.01); *F16H 47/02* (2013.01); *F16H 2306/20* (2013.01)

(56) References Cited

U.S. PATENT DOCUMENTS

| | | | |
|---|---|---|---|
| 6,012,782 A * | 1/2000 | Takahira | B60T 8/1764 |
| | | | 303/112 |
| 6,285,939 B1 | 9/2001 | Heitz et al. | |
| 6,481,314 B2 * | 11/2002 | Nemoto | F16H 47/02 |
| | | | 60/448 |
| 7,503,436 B2 * | 3/2009 | Matsuura | B60T 8/00 |
| | | | 188/1.11 E |
| 9,303,760 B2 * | 4/2016 | Vora | F16H 61/0437 |

FOREIGN PATENT DOCUMENTS

| | | |
|---|---|---|
| DE | 10 2013 222 693 A1 | 6/2015 |
| WO | 2015/067426 A1 | 5/2015 |

* cited by examiner

POWER SPLIT TRANSMISSION AND METHOD FOR OPERATING SUCH POWER SPLIT TRANSMISSION

This application claims priority from German patent application serial no. 10 2016 200 992.3 filed Jan. 25, 2016.

FIELD OF THE INVENTION

The invention concerns a power-split transmission device for a vehicle and a method for operating such a transmission device, such that the transmission device can in particular be used in a mobile working machine.

BACKGROUND OF THE INVENTION

Vehicle drive-trains of mobile working machines, in particular wheel loaders, are more and more often built with continuously variable power-split transmission devices which are made with a variator, a reversing transmission and range clutches. In the area of the reversing transmission spur gear stages or planetary gearsets are usually provided, such that the travel direction of the working machine is determined by the corresponding engagement of disk clutches. Driving ranges, within which a transmission ratio of the power-split transmission can be varied continuously by means of the variator, are obtained by coupled planetary gearsets or spur gear stages. To obtain driving range changes, as a rule disk clutches are used as the shifting elements. Furthermore, the variator is often designed as a hydrostatic transmission with hydrostatic units that can in each case be operated as a pump or a motor in combination with a power-splitting arrangement.

When the transmission ratio of the power-split transmission device is adjusted, for example starting from small transmission ratios toward larger transmission ratios, in each case one or more driving ranges are respectively passed through in part or totally, and for this the hydrostatic unit has to be swiveled several times over the complete driving range. For example, if two driving ranges which have to be completely passed through are considered, then around 0.5 to 1.0 seconds are needed for passing through the driving ranges and a further 150 to 200 ms are needed for the necessary driving range change, so that in total approximately 0.65 to 1.2 seconds pass by until a maximum transmission ratio is produced in the area of the transmission device. When a wheel loader drives onto a pile or heap, the load imposed from outside increases, in particular the deceleration, in less than 0.2 seconds. The control speed or speed of change of the transmission ratio in the area of the transmission device is therefore, disadvantageously, too low to avoid unacceptable decelerations of the rotational speed of a drive engine when driving onto a heap. Owing to the high control speeds of the hydrostatic unit required in combination with the unavoidable dead time associated with a driving range change, new methods are needed in order to satisfy the strict requirements for dynamics and for the protection of the engine and the transmission.

For example, DE 10 2013 222 693 A1 discloses a method for operating a vehicle drive-train with a drive engine and a power-split transmission device that can be brought, on the input side, into functional connection with the drive engine, which on its output side can be connected to a drive output, and whose transmission ratio in the area of a variator can be varied continuously, and with a shifting element which is arranged in the power flow of the vehicle drive-train between the drive engine and the drive output and whose transmission capacity can be varied continuously. The transmission capacity of the shifting element is varied as a function of the torque to be transmitted at the time in the drive-train between the drive engine and the drive output, and if the torque applied is greater than a defined threshold value, the shifting element changes to slipping operation.

SUMMARY OF THE INVENTION

The purpose of the present invention is to provide a power-split transmission device and a method for operating the transmission device, which show greater deceleration dynamics in order to protect the transmission device and the drive engine in unfavorable operating situations.

This objective is achieved by the transmission device and method for operating the same as described below.

According to the invention, the power-split transmission device for a vehicle is provided in order to connect a drive engine arranged on its input side to a drive output arranged on its output side. The transmission device comprises a hydrostatic unit for the continuous adjustment of a transmission ratio and at least one range clutch for coupling the transmission device to the drive output, wherein the transmission device is designed to be operated with a first and a second deceleration logic such that the second deceleration logic has a higher deceleration dynamic than the first deceleration logic, and wherein the second deceleration logic is provided in order to immediately open a closed range clutch so as to reduce the transmission ratio by means of the hydrostatic unit with maximum dynamic.

Preferably, the transmission ratio of the hydrostatic unit is displaced toward zero transmission ratio with maximum gradient regardless of the driving range at the time. In particular the drive engine is an internal combustion engine, preferably a Diesel engine and serves to propel the vehicle. The transmission ratio of the transmission device is adjusted by active displacement of the hydrostatic unit. In particular, for this a yoke of the hydrostatic unit is moved between a zero position and a maximum deflection. Moreover, the at least one range clutch is provided in order to couple a driving range of the hydrostatic unit, within which the transmission ratio can be varied continuously, to the drive output. Furthermore, it is conceivable for the transmission device to have a plurality of range clutches, each range clutch being provided in order to couple a respective driving range to the drive output.

The first deceleration logic represents essentially a normal operating condition of the transmission device. During normal operation when the vehicle decelerates, for example when it is braked from a high speed down to rest, all the driving ranges are passed through. Thus, depending on the number of driving ranges, a plurality of driving range changes are carried out. An actual reciprocal transmission ratio follows a nominal transmission ratio set by the hydrostatic device. By definition the actual reciprocal transmission ratio is equal to the quotient of the drive output rotational speed and the drive input rotational speed of the transmission device.

In contrast, the second deceleration logic represents an emergency shift of the transmission device provided in order to protect the transmission device and the drive engine. During the second deceleration logic the nominal transmission ratio follows the actual reciprocal transmission ratio. In particular, the second deceleration logic is activated for highly dynamic driving movements of the vehicle. A highly dynamic driving movement is understood to mean, for example, when a wheel loader climbs up a solid heap at speed. In such a case a high deceleration dynamic occurs whose result is that the nominal transmission ratio cannot follow the actual reciprocal transmission ratio. The second deceleration logic has higher deceleration dynamics than the first deceleration logic. When the second deceleration logic is activated a closed range clutch is opened immediately. This separates the transmission device and the drive engine from the drive output. Moreover, this makes it possible for the nominal transmission ratio to be reduced by means of the hydrostatic unit with the maximum dynamics. Thus, the various driving ranges are no longer passed through. Maximum dynamics is understood to mean that a maximum nominal transmission ratio gradient is used. This makes it possible for the nominal transmission ratio to follow the reciprocal transmission ratio.

According to a preferred embodiment, three range clutches are provided in order to obtain three driving ranges, such that in each driving range the transmission ratio can be adjusted continuously by means of the hydrostatic unit. To accelerate the vehicle, the first range clutch is closed and the nominal transmission ratio is adjusted by means of the hydrostatic unit to the synchronous transmission ratio for the driving range change. During the driving range change from the first driving range to the second driving range the first and second range clutches are synchronized with one another, and the second range clutch is closed while the first range clutch is opened. As soon as the driving range change has been completed, the nominal transmission ratio in the second driving range is adjusted by means of the hydrostatic unit to the synchronous transmission ratio for the next driving range change. During the driving range change from the second to the third driving range, the second and third range clutches are synchronized with one another and the third range clutch is closed while the second range clutch is opened. As soon as this driving range change has been completed, the nominal transmission ratio in the third driving range is adjusted by means of the hydrostatic unit. During deceleration, in particular when braking the vehicle from the third driving range down to rest, the three driving ranges are passed through in the reverse sequence.

The method according to the invention for operating the above-mentioned power-split transmission device comprises essentially the following process steps: monitoring of various vehicle parameters while the vehicle is operated with a first deceleration logic, detection that while the vehicle is being operated with the first deceleration logic at least one established limit value has been exceeded, activation of the second deceleration logic whereby a closed range clutch is opened immediately, maximum reduction of a transmission ratio by means of the hydrostatic unit, wherein the hydrostatic unit is displaced with a maximum dynamic, and closing the range clutch and activation of the first deceleration logic. Thus, the second deceleration logic is activated as soon as it is seen from the vehicle parameters monitored that the deceleration dynamics of the first deceleration logic no longer suffice for the nominal transmission ratio to be adapted to the actual reciprocal transmission ratio. To assess when the deceleration dynamics of the first deceleration logic are no longer sufficient, limit values for various vehicle parameters are defined. These vehicle parameters are monitored and if at least one established limit value is exceeded, the second deceleration logic is activated. In other words, the exceeding of at least one established limit value serves as the triggering condition for activating the second deceleration logic.

Below, preferred triggering conditions for activating the second deceleration logic are described. Preferably, the second deceleration logic is activated when at least one triggering condition has been fulfilled. According to a further preferred embodiment, the second deceleration logic is activated when all the triggering conditions have been fulfilled. It is conceivable, moreover, to weight the various triggering conditions to different extents. In particular, it is envisaged that several more highly weighted triggering conditions bring about the activation of the second deceleration logic. Advantageously the activation of the second deceleration logic can be countermanded in some circumstances, particularly when information about a lifting frame or scoop position of the vehicle is known.

Preferably, the second deceleration logic is activated when at least one actual drive output rotational speed gradient is smaller than a fixed limit value. The actual drive output rotational speed gradient is in particular a measure of the deceleration of the vehicle and describes how quickly the drive output rotational speed is changing and especially how quickly the vehicle is decelerating.

Preferably, the second deceleration logic is activated when at least one high pressure in the transmission device is higher than an established limit value. The high pressure in the transmission device is a measure for the loading of the hydrostatic unit and must not exceed a maximum limit value in order not to compromise the function of the hydrostatic unit. If the high pressure in the transmission device is above a transmission-damaging maximum pressure for a certain time, an emergency shift is triggered. Thus, the triggering condition is a maximum operating time above the transmission-damaging maximum pressure. For this, when the maximum pressure is exceeded a count value is incremented. When the high pressure falls below the maximum pressure, the count is decremented. If the maximum operating time is reached, the second deceleration logic is activated.

Preferably, the second deceleration logic is activated when at least an engine rotational speed and/or an engine rotational speed gradient is smaller than an established limit value. The drive engine is operated at an engine rotational speed that is within an acceptable range. A reduction of the engine rotational speed below the acceptable range can result in stalling of the engine or, in the worst case, to engine damage. Moreover, the engine rotational speed gradient describes how quickly the engine rotational speed is changing. Preferably, the second deceleration logic is activated when at least a reduction of the engine rotational speed is larger than an established limit value.

Preferably, the second deceleration logic is activated when at least a load on the drive engine is greater than an established limit value. The loading of the drive engine is preferably expressed as a percentage.

Preferably, the second deceleration logic is activated when at least a nominal reciprocal transmission ratio gradient is smaller than an established limit value. Thus, the second deceleration logic is activated in order to increase the nominal reciprocal transmission ratio gradient. This makes it possible for the nominal reciprocal transmission ratio to follow the actual reciprocal transmission ratio.

Preferably, when the second deceleration logic is activated the range clutch is reduced to a filling equalization pressure, in order thereafter, from that pressure level, to begin a torque-controlled engagement of the range clutch. In that way the range clutch operates without emptying completely, so that a torque can be built up more rapidly at the range clutch.

According to a preferred example embodiment, the range clutch is closed as soon as the actual reciprocal transmission ratio reaches a limit value. In particular, a zero position is defined as the limit value. Moreover, the limit value can also be larger than zero and then the range clutch is designed more efficiently.

In a further preferred example embodiment, a range clutch is closed as soon as a rotational speed difference reaches a limit value. The limit value of the rotational speed difference depends on the power of the range clutch. This, the range clutch can be closed even with a larger rotational speed difference if the range clutch is correspondingly more efficient and can perform the necessary shifting work and shifting power.

Preferably, the opening of the closed range clutch when the second deceleration logic is activated, is associated with an actuation of the brakes of the vehicle. When the second deceleration logic is activated, owing to the opening of the range clutch the drive-train is free, and the vehicle can therefore roll backward. To enable backward rolling and a more rapid closing of the range clutch, the activation of the second deceleration logic is associated with an actuation of the vehicle's brakes. In particular, the brakes are actuated below a certain drive output rotational speed. The brake of the vehicle can be both a holding brake and a service brake.

Preferably, conditions are also envisaged which allow activation of the first deceleration logic while the vehicle is being operated with the second deceleration logic. In particular, the first deceleration logic is activated again when the friction performance and/or the friction work at the range clutch exceeds a limit value. Furthermore, the first deceleration logic is activated again when a maximum time of operating with the second deceleration logic has been exceeded. Preferably, the maximum time for operating the vehicle with the second deceleration logic amounts to a few seconds. In addition, the first deceleration logic is activated again when, after a maximum operating time of the second deceleration logic, an actual drive output rotational speed has fallen to a certain value.

In particular, the power-split transmission device according to the invention can be used for providing drive power, and therefore in a mobile working machine.

BRIEF DESCRIPTION OF THE DRAWINGS

Below, an example embodiment of the invention is described in more detail with reference to the drawings, in which the same or similar elements are provided with the same indexes and which show.

DETAILED DESCRIPTION OF THE PREFERRED EMBODIMENTS

Figure 1:
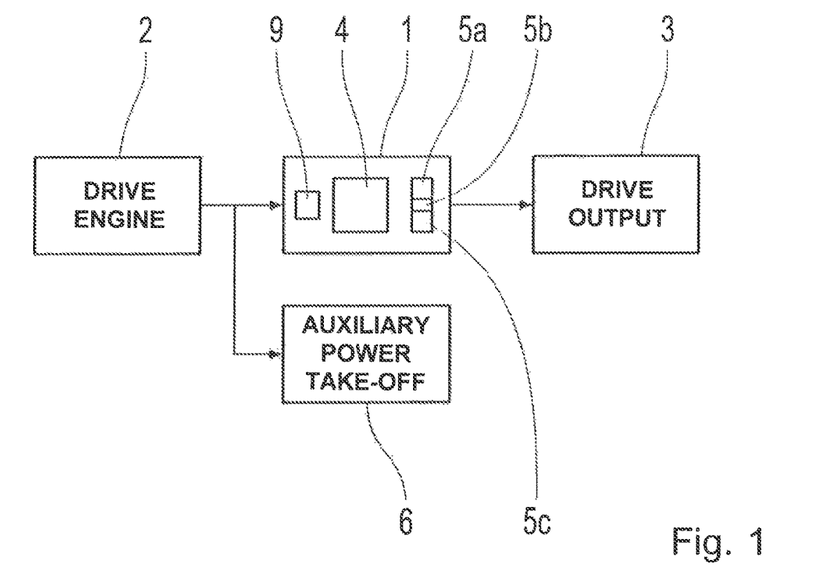
FIG. 1: A very schematic block circuit representation of a vehicle drive-train comprising a power-split transmission device according to the invention with a hydrostatic device.

As shown in FIG. 1, a vehicle drive-train comprises a drive engine 2 and a continuously variable power-split transmission device 1 that can be coupled thereto. In this case the drive engine 2 is in the form of an internal combustion engine, but in other embodiments of the drive-train it can also be an electric machine or a combination of an internal combustion engine and an electric machine. On the transmission output side the transmission device 1 is in functional connection with a drive output 3 so that a drive torque produced by the drive engine 2, converted in accordance with the transmission ratio set in the area of the transmission device 1, is provided as the drive output torque in the form of a corresponding traction force. The transmission device 1 comprises a hydrostatic unit 4 for the continuous adjustment of the transmission ratio, three range clutches 5a, 5b, 5c for coupling the transmission device 1 to the drive output 3, and a reversing clutch 9 for enabling the vehicle to drive in the forward and in the reversing direction. Embodiments with only one range clutch 5a, 5b, 5c are also conceivable. Usually, a clutch (not shown here) for forward driving and a clutch (also not shown) for driving in reverse are arranged in the reversing clutch. However, the reversing clutch can also be in the form of a dual shifting element, which means that for the respective actuation of the clutches for driving forward or in reverse a single, common actuator is operated. Furthermore, in the area between the drive engine 2 and the transmission device 1, an auxiliary power take-off 6 in the form of a working hydraulic system can be acted upon by torque from the drive engine 2. According to the invention, the transmission device 1 is designed to be operated with a first and a second deceleration logic such that the second deceleration logic has higher deceleration dynamics than the first deceleration logic. For this the second deceleration logic is designed so as to immediately open whichever range clutch 5a, 5b, 5c is closed, in order to reduce the transmission ratio by means of the hydrostatic unit 4 with the maximum dynamic. During this the reversing clutch remains constantly closed in the shifting position for forward driving.

According to FIGS. 2, 3, 4 and 5, starting from a high transmission ratio the transmission device 1 is in each case adjusted in the direction toward lower transmission ratios. In the diagrams, time is plotted along the abscissa and the transmission ratio along the ordinate.

Figure 2:
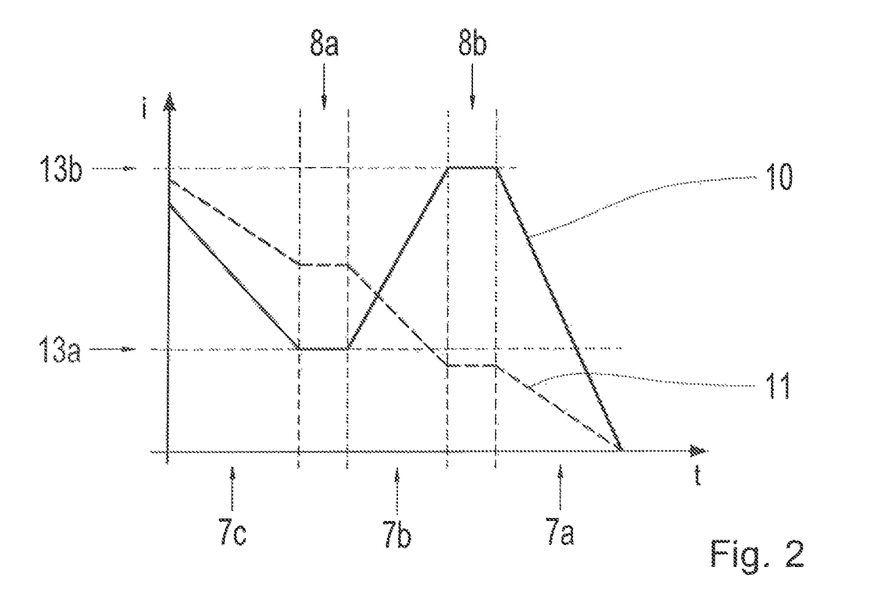
FIG. 2: A diagram to illustrate a variation of a transmission ratio of the hydrostatic unit and an actual reciprocal transmission ratio that depends on it.

FIG. 2 shows how a transmission ratio 10 of the hydrostatic unit 4 is adjusted in the respective driving range 7a, 7b, 7c in accordance with a first deceleration logic in order to reduce an actual reciprocal transmission ratio 11. The transmission ratio 10 of the hydrostatic unit 4 is understood to be a nominal transmission ratio of the hydrostatic unit 4, namely a desired transmission ratio of the hydrostatic unit 4. By definition, the actual reciprocal transmission ratio 11 is equal to the quotient of a drive output rotational speed and a drive input rotational speed of the transmission device 1, the drive output rotational speed and the drive input rotational speed preferably being measured by a sensor in each case. During any driving range change 8a, 8b the actual reciprocal transmission ratio 11 and the transmission ratio 10 of the hydrostatic unit 4 cannot be adjusted. In a third driving range 7c the transmission ratio 10 of the hydrostatic unit 4 is adjusted from high transmission ratios, analogously to the actual reciprocal transmission ratio 11, in the direction of a first synchronous point 13a toward lower transmission ratios. In a first driving range change 8a the third and second range clutches 5c, 5b are synchronized. The second range clutch 5b is closed and the third range clutch 5c is opened. The second driving range is activated. In the second driving range 7b the actual reciprocal transmission ratio 11 decreases toward a second synchronous point 13b, whereas the transmission ratio 10 of the hydrostatic unit 4 increases to higher values. In a second driving range change 8b the second and first range clutches 5b, 5a are synchronized. The first range clutch 5a is closed and the second range clutch 5b is opened. The first driving range 7a is activated. In the first driving range 7a the transmission ratio 10 of the hydrostatic unit 4 is adjusted from a high transmission ratio, analogously to the actual reciprocal transmission ratio 11, in the direction of the stationary point toward lower transmission ratios. The first deceleration logic is provided for normal deceleration operation, wherein the actual reciprocal transmission ratio 11 is set in accordance with the transmission ratio 10 of the hydrostatic unit 4. Accordingly, the actual reciprocal transmission ratio 11 follows the transmission ratio 10 of the hydrostatic unit 4.

When higher dynamics are required, in particular as regards the adjustment dynamics of the transmission ratio, the first deceleration logic comes up against its limits. In other words, in the event of an exceptional deceleration the transmission ratio cannot be adjusted quickly enough so the transmission ratio 10 of the hydrostatic unit 4 cannot follow the actual reciprocal transmission ratio 11. As a result, either the rotational speed of the drive engine 2 is reduced too much or a high pressure in the hydrostatic unit 4 reaches unacceptably high values which can damage the transmission device 1. According to the invention, it is then proposed to operate the transmission device 1 with a second deceleration logic having higher deceleration dynamics than the first deceleration logic.

Figure 3:
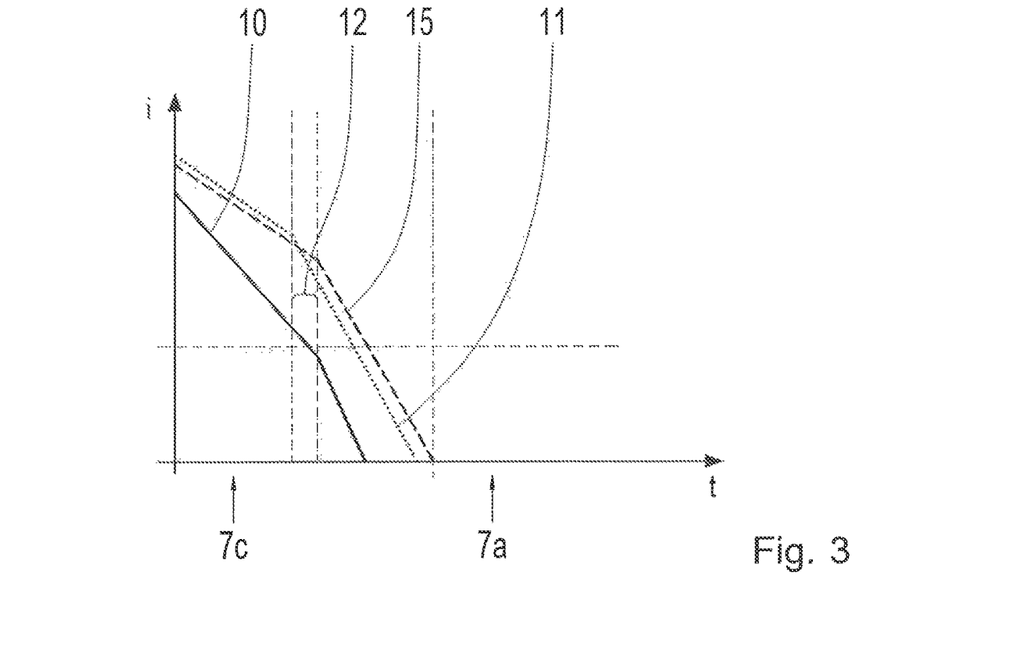
FIG. 3: A diagram to illustrate a variation of a nominal reciprocal transmission ratio, the transmission ratio of the hydrostatic unit, and the actual reciprocal transmission ratio that depends on it, when the second deceleration logic is activated in a third driving range.

FIG. 3 shows how, when the second deceleration logic has been activated in the third driving range 7c, the transmission ratio 10 is adjusted in order to obtain a desired nominal reciprocal transmission ratio 15 which substantially matches the actual reciprocal transmission ratio 11. When the second deceleration logic is activated the closed third range clutch 5c is opened immediately so that the stress on the drive engine 2 and the transmission device 1 is reduced. The reversing clutch 9 remains closed. During a waiting period 12, the transmission ratio 10 of the hydrostatic unit 4 is adjusted with the existing nominal dynamic until the second range clutch 5b is fully open so that the second range clutch 5b no longer transmits any torque. After the end of the waiting period 12, the transmission ratio 10 of the hydrostatic unit 4 is adjusted directly to the zero position with the maximum dynamic. Thereafter, the first range clutch 5a is engaged and the first driving range 7a is activated, so that there is no traction force interruption.

Figure 4:
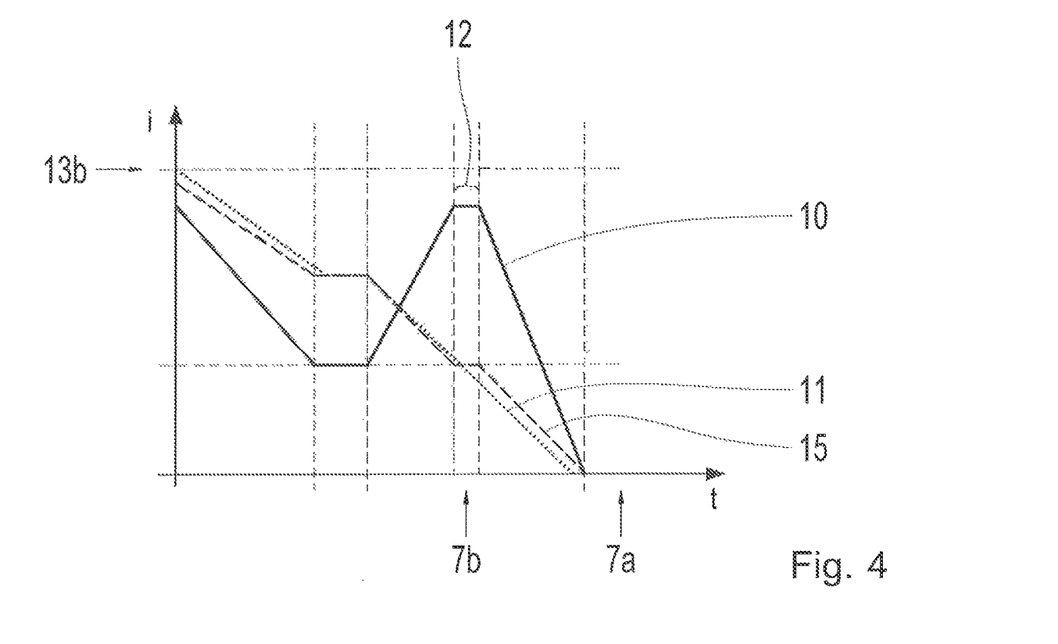
FIG. 4: A diagram to illustrate a variation of a nominal reciprocal transmission ratio, the transmission ratio of the hydrostatic unit, and the actual reciprocal transmission ratio that depends on it, when the second deceleration logic is activated in a second driving range.

FIG. 4 shows how, when the second deceleration logic in the second drive range 7b has been activated, the transmission ratio 10 of the hydrostatic unit 4 is adjusted in order to obtain the desired nominal reciprocal transmission ratio 15 in such manner that it substantially matches the actual reciprocal transmission ratio 11. When the second deceleration logic is activated the closed second range clutch 5b is opened immediately, such so that the load on the drive engine 2 and the transmission device 1 is reduced. The reversing clutch 9 remains closed. During a waiting period 12, the transmission ratio 10 of the hydrostatic unit 4 is not adjusted, but is unchanged, since here a normal adjustment would be accompanied by an increase in the transmission ratio 10 of the hydrostatic unit 4 in the direction of the second synchronous point 13b during the deceleration. After the end of the waiting period 12, the transmission ratio 10 of the hydrostatic unit 4 is adjusted directly to the zero position with the maximum dynamic. The first range clutch 5a is then engaged and the first drive range 7a is activated such that no or only a small interruption of the traction force take place.

Figure 5:
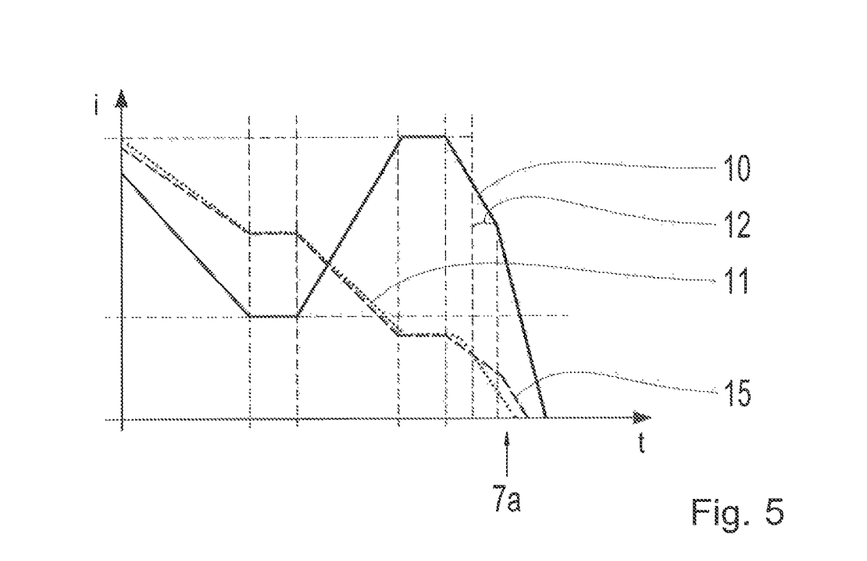
FIG. 5: A diagram to illustrate a variation of a nominal reciprocal transmission ratio, the transmission ratio of the hydrostatic unit, and the actual reciprocal transmission ratio that depends on it, when the second deceleration logic is activated in a first driving range.

FIG. 5 shows how, when the second deceleration logic in the first drive range 7a has been activated, the transmission ratio 10 of the hydrostatic unit 4 is adjusted in order to obtain the desired nominal reciprocal transmission ratio 15 in such manner that it substantially matches the actual reciprocal transmission ratio 11. This adjustment of the transmission ratio 10 of the hydrostatic unit 4 is identical to the adjustment of the transmission ratio 10 of the hydrostatic unit 4 in the third drive range 7c according to FIG. 3. When the second deceleration logic is activated the closed first range clutch 5a is opened immediately. The reversing clutch 9 remains closed. During a waiting period 12, the transmission ratio 10 of the hydrostatic unit 4 is adjusted with the existing nominal dynamic. After the end of the waiting period 12, the transmission ratio 10 of the hydrostatic unit 4 is adjusted directly to the zero position with the maximum dynamic. The first range clutch 5a is then engaged again.

Figure 6:
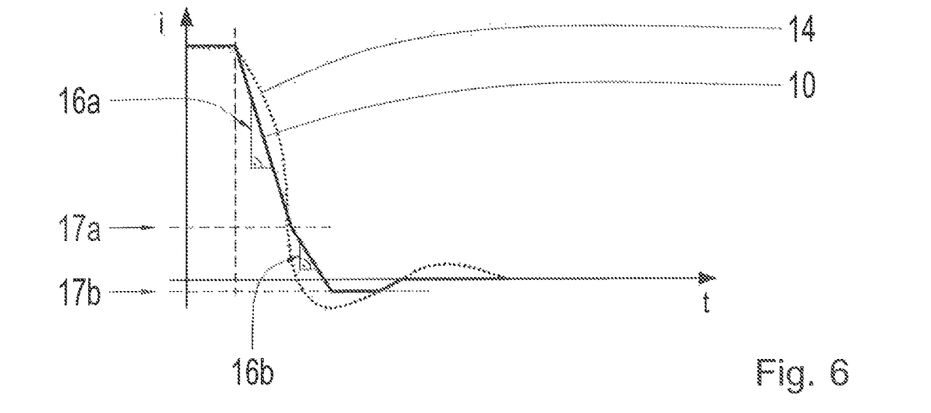
FIG. 6: A diagram to illustrate a variation of the nominal reciprocal transmission ratio and the actual reciprocal transmission ratio when the second deceleration logic is activated.

FIG. 6 is a diagram showing the respective variations of the nominal transmission ratio 10 and the actual transmission ratio of the hydrostatic unit 4, with time plotted along the abscissa and transmission ratio along the ordinate. The actual transmission ratio of the hydrostatic unit 4 represents a real variation of the transmission ratio, whereas the nominal transmission ratio 10 of the hydrostatic unit 4 is a desired variation of the transmission ratio of the hydrostatic unit 4. When the second deceleration logic has been activated the transmission ratio of the hydrostatic unit 4 is adjusted in the direction toward zero. This return is carried out with the gradient 16a as far as a threshold value 17a. Thereafter, a yoke of the hydrostatic unit 4—not shown here—is readjusted as a function of the actual transmission ratio of the hydrostatic unit 4. During this readjustment of the actual transmission ratio of the hydrostatic unit 4, the nominal transmission ratio of the hydrostatic unit 4 is adjusted with a second gradient 16b, which is smaller than the first gradient 16a, in order to achieve smooth regulation. FIG. 6 describes the case in which after passing through zero the vehicle rolls slightly backward. In that case the nominal transmission ratio below the zero position is set to the lowest threshold value 17b. In other words, the hydrostatic unit 4 overshoots. This reduces a rotational speed difference when the first range clutch 5a is engaged.

Figure 7:
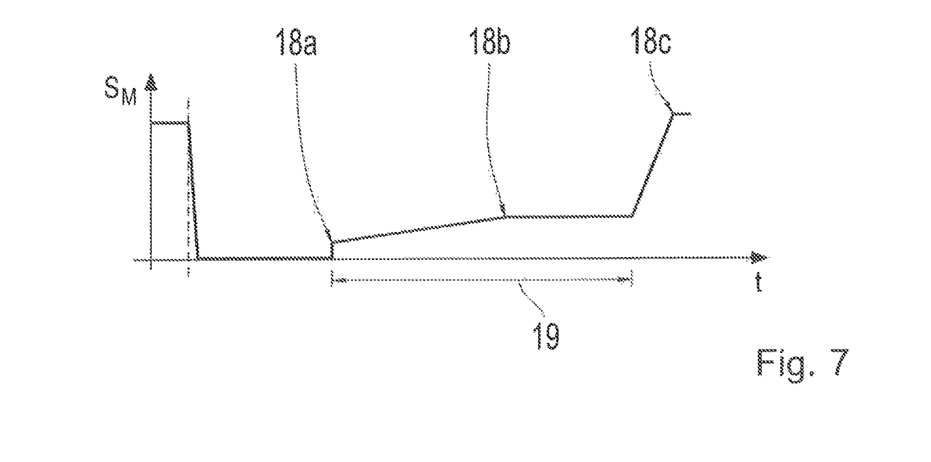
FIG. 7: A diagram to illustrate the variation of the closing torque at a first range clutch.

FIG. 7 is a diagram showing a variation of a closing torque of the first range clutch 5a, wherein time is plotted along the abscissa and closing torque along the ordinate. When the second deceleration logic has been activated and the closed range clutch 5a, 5b, 5c concerned has been opened, the first range clutch 5a is engaged. This engagement of the first range clutch 5a follows an exactly defined, torque-controlled process. The loading limits of the first range clutch 5a in relation to friction performance and friction work must not be exceeded. Due to the starting by means of the first range clutch 5a, traction force is quickly built up again in the forward direction. To begin with, an initial first closing torque 18a is applied at the first range clutch 5a. Starting from that closing torque 18a, the torque is increased during a time interval as far as a second closing torque 18b, whereby the first range clutch 5a produces a frictional connection between the transmission device 1 and the drive output 3. The second closing torque 18b is chosen such that a predetermined friction performance is not exceeded, but at the same time sufficient closing torque is built up to stop the vehicle from rolling backward and bring it to rest. After a minimum time interval 19, the first range clutch 5a is closed in that the closing torque is increased to a third closing torque 18c by way of a maximum gradient. However, this only takes place if after the lapse of the minimum time interval 19 a predefined maximum rotational speed difference of the clutch is not exceeded. If the rotational speed difference at the clutch is exceeded, the torque is maintained until the rotational speed difference falls below the predefined maximum rotational speed difference of the clutch and only then is the clutch closed completely. Accordingly the range clutch 5a is closed, whereby the first deceleration logic is activated again.

INDEXES

1 Transmission device
2 Drive engine
3 Drive output
4 Hydrostatic unit
5a to 5c Range clutch
6 Auxiliary power take-off
7a to 7c Driving range
8a, 8b Driving range change
9 Reversing clutch
10 Nominal transmission ratio
11 Actual reciprocal transmission ratio
12 Waiting time
13a, 13b Synchronous point
14 Actual transmission ratio
15 Nominal reciprocal transmission ratio
16a, 16b Gradient
17a, 17b Threshold value
18a to 18c Closing torque
19 Minimum time interval

The invention claimed is:

1. A power-split transmission device for a vehicle, the transmission device connecting a drive engine, arranged on an input side, to a drive output, arranged on an output side, and the transmission device comprising:
  a hydrostatic unit for continuous adjustment of a transmission ratio;
  at least one range clutch for coupling the transmission device to the drive output;
  the transmission device being designed to be operated with a first and a second deceleration logic, the first and the second deceleration logic having a deceleration dynamic which corresponds to a gradient of transmission ratio change, the second deceleration logic having a higher gradient of transmission ratio change than a gradient of transmission ratio change of the first deceleration logic, and such that the second deceleration logic being designed so as to immediately disengage the at least one range clutch, when the at least one range clutch is engaged, in order to reduce the transmission ratio of the hydrostatic unit with a maximum gradient of transmission ratio change;
  the transmission device being configured to monitor various vehicle parameters while the vehicle is operated with the first deceleration logic;
  the transmission device further being configured to detect that at least one set limit value has been exceeded while the vehicle is operated with the first deceleration logic;
  the at least one range clutch being configured to immediately disengage upon activation of the second deceleration logic;
  the hydrostatic unit being configured to maximally reduce the transmission ratio with a maximum dynamic; and
  the at least one range clutch being configured to engage and the first deceleration logic being configured to activate as soon as either an actual reciprocal transmission ratio reaches a first limit value, or a rotational speed difference reaches a second limit value.

2. The transmission device according to claim 1, wherein the transmission device comprises three range clutches for producing three driving ranges such that, in each driving range, the transmission ratio is continuously adjustable by the hydrostatic unit.

3. A method of operating a power-split transmission device for a vehicle, the transmission device connecting a drive engine, arranged on an input side, to a drive output, arranged on an output side, and including a hydrostatic unit for continuous adjustment of a transmission ratio, and at least one range clutch for coupling the transmission device to the drive output, the transmission device being designed to be operated with a first and a second deceleration logic, such that the second deceleration logic has a higher deceleration dynamic than the first deceleration logic, and such that the second deceleration logic is designed so as to immediately disengage the at least one range clutch, when the at least one range clutch is engaged, in order to reduce the transmission ratio by the hydrostatic unit with a maximum dynamic, the method comprising:
  a) monitoring various vehicle parameters while the vehicle is operated with the first deceleration logic;
  b) detecting that at least one set limit value has been exceeded while the vehicle is being operated with the first deceleration logic;
  c) activating the second deceleration logic whereby the at least one range clutch (5a) is immediately disengaged;
  d) maximumly reducing the transmission ratio by the hydrostatic unit, and the hydrostatic unit being displaced with a maximum dynamic; and
  e) engaging the at least one range clutch and activating the first deceleration logic as soon as either an actual reciprocal transmission ratio reaches a first limit value, or a rotational speed difference reaches a second limit value.

4. The method according to claim 3, further comprising activating the second deceleration logic when at least one actual rotational speed gradient is smaller than an established limit value.

5. The method according to claim 3, further comprising activating the second deceleration logic when at least one high pressure in the transmission device exceeds an established limit value.

6. The method according to claim 3, further comprising activating the second deceleration logic when at least one of an engine rotational speed and an engine rotational speed gradient is smaller than an established limit value.

7. The method according to claim 3, further comprising activating the second deceleration logic when at least a load on the drive engine (2) exceeds an established limit value.

8. The method according to claim 3, further comprising activating the second deceleration logic when at least a reduction of an engine rotational speed is greater than an established limit value.

9. The method according to claim 3, further comprising activating the second deceleration logic when at least a nominal reciprocal transmission ratio gradient is smaller than an established limit value.

10. The method according to claim 3, further comprising associating the disengaging of the at least one range clutch, when the second deceleration logic is activated, with an actuation of a brake of the vehicle.

11. A method of operating a power-split transmission of a vehicle which connects a drive engine to a drive output and which includes a hydrostatic unit that facilitates continuous adjustment of a transmission ratio, and a range clutch that couples a transmission device to the drive output, the transmission device is operable with a first deceleration logic and a second deceleration logic, the first deceleration logic having a first gradient of transmission ratio change, and the second deceleration logic having a second gradient of transmission ratio change, the second gradient of transmission ratio change being greater than the first gradient of transmission ratio change, and the second deceleration logic immediately disengages the range clutch, when the range clutch is engaged, in order to reduce the transmission ratio by the hydrostatic unit with a maximum gradient of transmission ratio change, the method comprising:

operating the vehicle with the first deceleration logic and the range clutch engaged;

monitoring values of a plurality of vehicle parameters and comparing the values of the plurality of vehicle parameters to corresponding set limit values of the plurality of vehicle parameters;

recognizing that at least one of the monitored values of the plurality of vehicle parameters exceeds the corresponding set limit values of the plurality of vehicle parameters while the vehicle is operating with the first deceleration logic;

activating the second deceleration logic with which the range clutch is immediately disengaged;

displacing the hydrostatic unit with the maximum gradient of transmission ratio change to maximumly reduce the transmission ratio; and engaging the range clutch and activating the first deceleration logic as soon as either an actual reciprocal transmission ratio reaches a first limit value, or a rotational speed difference reaches a second limit value.

* * * * *